Jan. 11, 1927.  
A. H. DYCKERHOFF  
1,613,877  
DEVICE FOR MEASURING THE TEMPERATURE OF FLUIDS  
Filed May 25, 1922
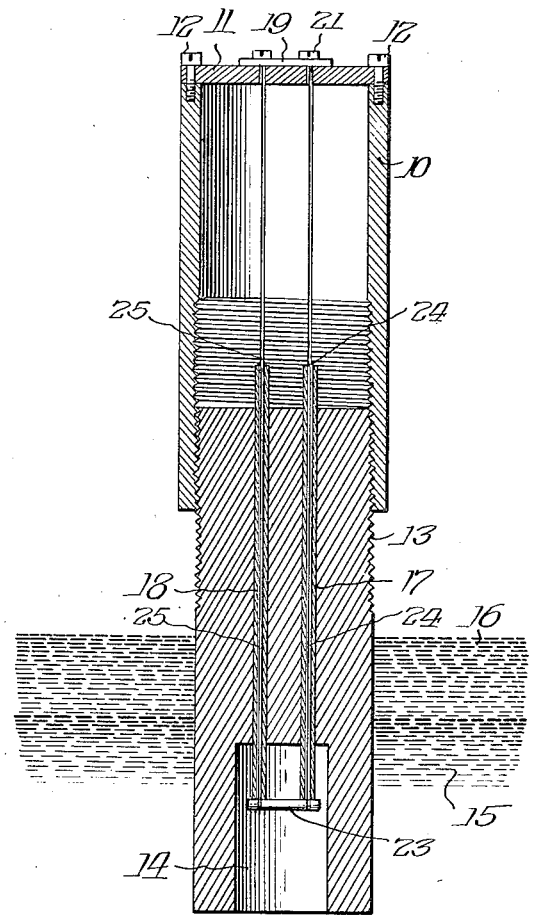
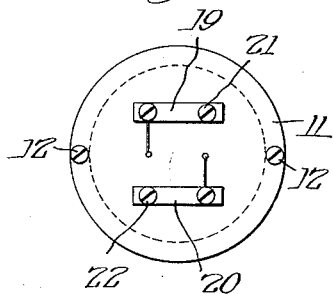
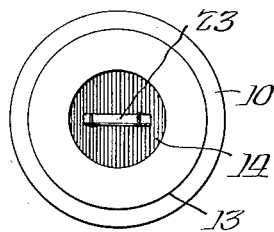

Patented Jan. 11, 1927.

1,613,877

UNITED STATES PATENT OFFICE.

ADOLPH H. DYCKERHOFF, OF CHICAGO, ILLINOIS.

DEVICE FOR MEASURING THE TEMPERATURE OF FLUIDS.

Application filed May 25, 1922. Serial No. 563,640.

My invention relates to a device for ascertaining or measuring the temperature of fluids and particularly of molten iron, or steel or other metals in ladles, furnaces, or the like, and has particular reference to an instrument which is placed into the fluid or molten steel and the temperature thereof ascertained by measuring the relative electrical conductivity of an element composed of an oxide of rare earth or a mixture of several oxides of rare earth or the like. The element is positioned in an open ended chamber formed in a member having high heat resisting qualities and is connected by suitable lead wires to an electric current measuring device, so that when the device is placed in a hot fluid and the temperature of the element increases, its conductivity increases and the resistance offered to an electric current flowing therethrough is decreased, such decrease of the resistance and the increase of the current thereby being registered by the current measuring device.

In the operation of steel producing furnaces, it is highly important that the temperature of the steel be known, particularly in the manufacture of alloy steel which is now in common use in many commercial lines of manufacture. Heretofore, the only method of ascertaining the temperature has been by an optical pyrometer and the temperature of the steel can only at best be approximated by such pyrometers; usually the temperature is determined by practical experience, both methods being very unsatisfactory. By the use of my improved invention, the temperature of molten metal is ascertained more exactly and very quickly and results in a superior quality of steel.

My invention will be more fully and better understood by reference to the accompanying sheet of drawings and in which—

Figure 1 is a vertical sectional view of the device embodying my invention;

Figure 2 is a horizontal plan view of the upper end of the device shown in the Figure 1;

Figure 3 is a horizontal plan view of the lower end of the device shown in Figure 1.

Referring now specifically to the drawings, I provide a metallic tube 10 which is closed at its upper end by means of plate 11 of refractory material having screws 12, 12 extending therethrough and into the wall of the tube 10 so the refractory plate 11 is held in position. The tube 10 may also be protected from the action of the flame by refractory cement or refractory sleeves. Mounted in the lower end of the tubing 10 and preferably in threaded engagement therewith is a rod 13 composed of graphite or other refractory material having a chamber or recess 14 in the lower end thereof, which is adapted to be inserted into a bath of metal such as is shown in Figure 1 and in which 15 represents the molten metal with a covering of slag 16 thereover and showing the rod 13 projecting through the slag 16 and into the molten metal 15. Extending longitudinally of the rod 13 is a pair of hollow members 17 and 18 composed of magnesia or other refractory material and which extend downward into the recess 14, the said members serving as insulating means for the current conducting wires 24 and 25 hereinafter described. Secured to the refractory plate 11 is a pair of terminals 19 and 20 by means of screws 21 and 22, the said terminals being composed of molybdenum or any other metal having a high melting point. The terminals and screws may be protected by refractory clay. The pair of current conducting wires 24 and 25 preferably composed of molybdenum or any other metal having a high melting point is secured to the terminal 19 and 20 respectively and they extend downward through the tube 10 and through the insulating members 17 and 18 and terminate at the lower ends of the members 17 and 18 and are connected to a transversely extending element 23 composed of oxides of rare earth such as scandium, lanthanum, thorium, cerium, zirconium, erbium, yttrium and titanium, or a mixture of the same, forming a current-resisting element between the terminal wires 25 and 24 heretofore described. Suitable current conducting wires leading from the terminals 19 and 20 are connected to a current measuring device and to a battery supplying constant electromotive force, thus completing the circuit.

In the operation of the device, the tubing 10 having the element 13 on the end thereof is inserted by means of a suitable holder or rig into the fluid such as molten metal or the like through the slag 16, the chamber 14, being air or gas tight, is filled, of course, with air when the device is placed into the metal. The oxygen is immediately burned out of the air by the molten steel or the like, but the nitrogen and other gases remain so that the hot liquid does not enter the chamber 14 except for a short distance, but the element 23 is in such close proximity to and surrounded by the hot gases of the molten bath that its temperature approaches very quickly that of the bath in which it is inserted and yet it is out of contact with the bath. If the metal would be in contact with the element 23, the current would pass through the hot metal having a lower resistance than the element, thus defeating the purpose of the invention. It is only necessary to measure the electric current flowing through the circuit, controlled by the resistance of the rare earth element 23 to determine the temperature of the fluid or molten steel in which the device is inserted by means of a calibration made previously.

While I have described more or less precisely the details of construction which I employ, I do not wish to be understood as limiting myself thereto, as I contemplate changes in form and the proportion of parts and the substitution of equivalents as circumstances may suggest or render expedient without departing from the spirit or scope of my invention.

I claim:

1. In combination, a temperature measuring device comprising a member composed of refractory material having at its lower end a downwardly opening recess, a pair of electrical conductors extending through the said member and terminating within said recess, and a member composed of oxides of rare earth connecting the said electrical conductors at their ends.

2. Temperature measuring device, comprising an element made of refractory material, a pair of electrical conductors extending longitudinally of said refractory element, insulating members surrounding said electrical conductors extending through said element, a resistance member composed of oxides of rare earth connecting the electrical conductors at their free ends, the said refractory element having at its lower end a downwardly opening recess within which the resistance element is positioned.

3. In combination, a temperature measuring device comprising a refractory member having at its lower end a downwardly opening recess, a pair of electrical conductors extending through said refractory member and terminating in said recess, and a resistance element connecting the said electrical conductors at their lower ends.

4. A temperature measuring device comprising in combination, a tube, a refractory member detachably connected to the said tube and having a downwardly opening recess at its lower end, a pair of electrical conductors extending longitudinally of said refractory member in spaced parallel relation with each other, the free ends of said conductors terminating in said recess, and a resistance element connecting the free ends of said electrical conductors.

Signed at Chicago, Illinois, this 17th day of May, 1922.

ADOLPH H. DYCKERHOFF.